United States Patent Office 3,425,953
Patented Feb. 4, 1969

3,425,953
DISPERSION PROCESS AND COMPOSITION
Jack C. Cowan, Augustus Earl Beasley, Jr., John W. Jordan, and Claude Malcolm Finlayson, Houston, Tex., and Robert O. Stearns, Barstow, Calif., assignors to National Lead Company, New York, N.Y., a corporation of New Jersey
No Drawing. Continuation-in-part of application Ser. No. 244,905, Dec. 17, 1962. This application Jan. 28, 1966, Ser. No. 523,548
The portion of the term of the patent subsequent to Feb. 1, 1983, has been disclaimed and dedicated to the Public
U.S. Cl. 252—363.5     2 Claims
Int. Cl. B01f 3/00; C09k 3/00; C10m

ABSTRACT OF THE DISCLOSURE

A composition of matter is provided in which a long-chain alkyl ammonium lignosulfonate (such as dimethyl dioctadecyl ammonium lignosulfonate) is dispersed in an organic liquid vehicle (such as a petroleum oil), accompanied by a chemical compound selected from a named class (such as nonyl phenol, octanoic acid, phenyl acetate, etc.) and having a dispersibility-enhancing effect on the lignosulfonate.

---

This application is a continuation-in-part of our co-pending application Ser. No. 244,905, filed Dec. 17, 1962, now Patent No. 3,232,870, issued Feb. 1, 1966.

This invention relates to dispersion aids for expediting the dispersion of long-chain ammonium lignosulfonates in organic liquids.

Lignosulfonates are salts of lignosulfonic acid, which is a material formed when the lignin of wood is solubilized by the sulfite process of pulp manufacture; and indeed, may be derived from wood lignin by other routes. Lignosulfonates are common articles of commerce, widely available in the form of their simple water-soluble salts, such as sodium, calcium, ammonium, and mixtures thereof.

A quite special class of lignosulfonates is the salts of lignosulfonic acid formed by reaction with a long-chain organic cation, and more particularly, alkyl ammonium lignosulfonates having a hydrocarbon chain of between 12 and 22 carbon atoms in a straight chain. Such materials, and methods for their production from simple lignosulfonates are described in Ehrensperger Patent 2,594,302, and more particularly, in our co-pending application Ser. No. 244,905 cited hereinabove. The disclosures of the said Ehrensperger patent and the said co-pending application Ser. No. 244,905 are hereby incorporated herein by reference.

As set forth in our said co-pending application, long-chain ammonium lignosulfonates of the type described have the remarkable properties of compatibility with and dispersibility in a wide variety of organic liquids. As may be readily imagined, some organic liquid long-chain ammonium lignosulfonate combinations are more readily subject to dispersion than others. In favorable cases, it suffices merely to add the long-chain lignosulfonates to the organic liquid, at room temperature, with perhaps simple stirring, whereupon the lignosulfonate becomes dispersed therein to a substantially colloidal or possibly even molecular dispersion. In less favorable cases, more drastic agitation than simple stirring may be necessary, such as the use of a colloid mill, a three-roller paint mill, homogenizers, such as are used in the lubricating grease art, and so forth. Moreover, elevated temperatures may be necessary; or a combination of elevated temperatures and high shear agitation. While it may be stated as a general proposition that simple stirring at room temperature will ultimately disperse the lignosulfonates even in a less favorable case, the actual time of stirring involved may be uneconomically long.

An object of the present invention is to provide an additive for long-chain ammonium lignosulfonates of the type described which facilitates, i.e., expedites, their dispersion in organic liquids.

Other objects of the present invention will become apparent as the description thereof proceeds.

Generally speaking and in accordance with an illustrative embodiment of our invention, we incorporate with a long-chain alkyl ammonium lignosulfonate which is to be used in an organic liquid vehicle, a chemical compound or indeed mixtures of several thereof, chosen from the group which consists of the following:

Table I mono ($C_1$–$C_{10}$ alkyl) phenols
di($C_1$–$C_{10}$ alkyl) phenols
(phenyl phenol)
$n$-chlorophenol where $n$ is mono through penta.
ethoxylated mono ($C_6$–$C_{10}$ alkyl) phenols having from 0 to 16 mols ethylene oxide per mol of phenol.
$C_6$–$C_{10}$-alkyl resorcinol
acrylic acid
octanoic acid
phytic acid
propylene glycol monoricinoleate ethoxylated with 10% to 40% ethylene oxide
sorbitan trioleate ethoxylated with 20 mols/mol of ethylene oxide
sorbitan monolaurate
sorbitan trioleate
castor oil propoxylated with 15% to 23% propylene oxide
phenyl acetate
phenyl propionate
$C_4$–$C_{16}$ alkanols
$C_6$–$C_{10}$-alkyl cyclohexanol
beta-naphthol It will be understood that in accordance with the usual practice, an expression such as "$C_6$–$C_{10}$-alkyl" means an alkyl group having from 6 to 10 inclusive carbon atoms.

The organic liquid may be any organic liquid including mixtures of several thereof, in which it is desired to facilitate dispersion of the long-chain ammonium lignosulfonates. Thus, for example, our co-pending application Ser. No. 244,905 shows the use of such lignosulfonates in well-working fluids in which the organic liquid may be a petroleum oil such as diesel oil, or kerosene or fuel oil. They also have important use in molding and sand core compositions, printing inks, and the like. In these, the organic liquid involved may again be a paraffin oil, including those already mentioned, and light and heavy lubricating oils and petrolatum; and liquid aliphatic alcohols from 6 carbon atoms upwards; liquid alkyl phenols in which the alkyl group is butyl or larger, and including, particularly, nonyl phenol; the polyethylene glycols commercially available, for example, under the trademark "Carbowax" and having average molecular weights of about 200 to 400; the analogous polyethylene glycols which have molecular weights of about 150 to 1,000; phosphate esters of ethoxylated alkyl phenols as described in United States Patent 3,004,056; and a wide variety of other comparable organic liquids; and mixtures of any or all of these.

In general, the organic liquids which are used in various compositions in which long-chain ammonium lignosulfonates of the type described are to be dispersed are characterized by having a molecular weight of at least 125. This is true for the liquids already mentioned, which have been recited by way of example and not by way of limitation.

In general, the amount of the additive chemical compound as described hereinabove which is used to facilitate dispersion may be present in a weight ratio with respect to the aforesaid lignosulfonates within the range of about 1:100 and about 1:1. That is, for 100 pounds of long-chain ammonium lignosulfonate, from one pound to 100 pounds of the additive chemical compound will be used in admixture therewith in order to facilitate dispersion. It will be readily understood by those skilled in the chemical arts that in any given case, a wide range of relative proportions may be employed, often dictated by the economics involved. Indeed, any reduction in milling or homogenizing time is advantageous; so that even small relative amounts of additive are useful. On the other hand, if sufficient additive is used, so that, for example, dispersion may be effected at room temperature instead of at elevated temperatures, this again is of great economic importance. In many cases, it may be helpful to balance the cost of the additive against the savings in processing time and costs resulting from thus expediting the dispersion.

In general, the dispersing expediting chemical compound may be premixed with the long-chain ammonium lignosulfonates, and the mixture thus formed incorporated with the organic liquid; or all three components may be brought together simultaneously; or, indeed, the chemical compound may be mixed with the organic liquid first whereupon the long-chain ammonium lignosulfonate is dispersed therein. In many applications, it is a great convenience to premix the lignosulfonate and the chemical compound, and, indeed, this presents particular advantages in that the chemical compound then has time to act on the lignosulfonate itself, by way of a bond-loosening action, so that for any given combination of lignosulfonate, additive chemical compound, and organic liquid, the dispersion conditions are ameliorated most by such premixing as described. In order to show the effectiveness of the various chemical compounds in accordance with the invention in bringing about dispersion of long-chain ammonium lignosulfonates of the type described in organic liquids in a very short period of time, we have devised a testing routine in which 15 grams of dimethyl dioctadecylammonium lignosulfonate (chosen as a typical long-chain ammonium lignosulfonate) are added to 350 cc. of diesel oil together with 5 grams of the chemical compound to be evaluated, followed by stirring in a Waring Blendor for 5 minutes, at room temperature. It will be appreciated that this is an exceedingly mild mechanical treatment, particularly in view of the character of the diesel oil in being relatively non-polar, quite viscous, and of relatively high molecular weight, these being characteristics which in general do not favor ready dispersion of the type involved. The mixture thus formed, subsequent to the 5-minute stirring, is filtered against hardened filter paper, using the standard 100 p.s.i., 30-minute, room-temperature procedure of the American Petroleum Institute for testing drilling fluids. As described in the aforesaid application, Ser. No. 244,905, these lignosulfonates have remarkable properties of reducing the filterability of diesel oil when good dispersion has been achieved, so that the filter loss becomes an inverse measure of the degree of dispersion obtained in the 5-minute mixing, and thus of the ability of the test compound to expedite the dispersion.

Some test results are given below: It will be understood that a low filter loss denotes good dispersion; and it may be mentioned that other evidences of good dispersion, such as non-settling of the lignosulfonate, darkening of the liquid, and the like go hand-in-hand with the low filter loss.

Table II

| Chemical compound: | A.P.I. filter loss, cc. |
|---|---|
| Blank (no additive) | 21.0 |
| Nonyl phenol | 1.0 |
| Di nonyl phenol | 1.6 |
| Nonyl phenol w/4 mols ethylene oxide | 1.0 |
| Nonyl phenol w/6 mols ethylene oxide | 1.0 |
| Nonyl phenol w/9.5 mols ethylene oxide | 1.6 |
| Nonyl phenol w/12 mols ethylene oxide | 1.6 |
| Orthophenyl phenol | 0.6 |
| Paraphenyl phenol | 1.0 |
| Pentachlorophenol | 0.8 |
| Para ter-butyl phenol | 1.0 |
| Octyl resorcinol | 0.6 |
| Acrylic acid | 1.0 |
| Octanoic acid | 0.8 |
| Phytic acid | 1.0 |
| Sorbitan trioleate w/20 mols ethylene oxide | 1.0 |
| Sorbitan monolaurate | 1.5 |
| Sorbitan trioleate | 1.4 |
| Castor oil propoxylated w/15% propylene oxide | 1.0 |
| Castor oil propoxylated w/23% propylene oxide | 1.8 |
| Phenol acetate | 1.0 |
| Phenyl propionate | 1.0 |
| n-Hexyl alcohol | 0.4 |
| n-Butyl alcohol | 1.0 |
| Myristyl alcohol | 1.2 |
| Nonyl cyclohexanol | 1.2 |
| Beta-naphthol | 1.0 |

It will be observed that all of the compounds listed in Table II give a filter loss under the conditions already recited of not more than 2.0 cc.; and, indeed, for the specific chemical compounds listed, from 0.4 to 1.8 cc. This may be taken as a practical norm for selecting a given compound.

It is obviously impossible to list all chemical compounds which are effective for our inventive purposes; but fortunately, it is exceedingly convenient, quick, and simple to test 5 grams of any selected chemical compound with 15 grams of dimethyldioctadecyl ammonium lignosulfonate and 350 cc. of diesel oil, mixing in a blender for five minutes and then testing for filter loss by the aforesaid American Petroleum Institute procedure and determining whether the aforesaid 30-minute filter loss is 2 cc. or less.

As instances of compounds which are not effective in the invention, there follows some filtration values for ten various chemical compounds, tested in the same fashion as already described:

Table III

| | |
|---|---|
| Tartaric acid | min__ 35/5 |
| Myristic acid | 22.0 |
| Palmitic acid | 130. |
| Formic acid | 10.0 |
| Sorbitol | min__ 60.5 |
| Diethanol amine | 14.0 |
| Amyl amine | 32. |
| Para nitroaniline | min__ 60/5 |
| Pinacolone | 9.0 |
| Propionitrile | 20.0 |

It will have been observed in Table III that the blank test, that is, with no additive, gives 21 cc. in the standard test. Several of the compounds listed in Table III fail to give a really significant lowering of filter loss; and, indeed, several actually increased the filter loss over the blank. The figures given for tartaric acid, sorbitol, and para nitroaniline in Table III indicate that the filtration rate was so great that the test could not be prolonged for 30 minutes, so that the filtrate obtained in the time shown and collected and the test discontinued. Thus, the test with tartaric acid gives 35 cc. filtrate in five minutes.

By the term "long-chain alkyl ammonium lignosulfonate," we mean one in which a hydrocarbon chain of between 12 and 22 carbon atoms is present; and we mean to include any substituted ammonium ion in which at least one such long carbon chain is present, including not only substituted ammonium strictly speaking, but also substituted polyamines, such as diethylene triamine, tetraethylene pentamine, and the like; and heterocyclic nitrogen bases, such as pyridinium, imidazolinium, morpholinium, and the like.

It will be apparent that while we have described our invention with the aid of numerous specific examples, and have disclosed exemplary proportions, quantities, procedures, and the like, our invention is a broad one, and numerous variations in detail, such as choice of ingredients, proportions, processing conditions, and the like may be made without departing from the spirit and scope of the invention, as delineated by the claims which follow.

Having described our invention, we claim:

1. As a composition of matter, a mixture of a long-chain alkyl-ammonium lignosulfonate and a chemical compound chosen from the class consisting of the following, including mixtures thereof:

mono ($C_1$–$C_{10}$-alkyl) phenols
di ($C_1$–$C_{10}$-alkyl) phenols
phenyl phenol
$n$-chlorophenol where $n$ is mono through penta
ethoxylated mono ($C_6$–$C_{10}$-alkyl) phenols having from 0 to 16 mols ethylene oxide per mol of phenol.
$C_6$–$C_{10}$-alkyl resorcinol
acrylic acid
octanoic acid
phytic acid
propylene glycol monoricinoleate ethoxylated with 10% to 40% ethylene oxide
sorbitan trioleate ethoxylated with 20 mols/mol of ethylene oxide
sorbitan monolaurate
sorbitan trioleate
castor oil propoxylated with 15% to 23% propylene oxide
phenyl acetate
phenyl propionate
$C_4$–$C_{16}$-alkanols
$C_6$–$C_{10}$-alkyl cyclohexanol, and
beta-naphthol;

said chemical compound being present in a weight ratio to said lignosulfonate sufficient to substantially increase the dispersibility of said lignosulfonate in an organic liquid vehicle.

2. The composition in accordance with claim 1 in which said ratio is within the range of 1:100 and 1:1.

References Cited

UNITED STATES PATENTS

| | | | |
|---|---|---|---|
| 2,594,302 | 4/1952 | Ehrensperger | 260—124 |
| 2,850,492 | 9/1958 | Erskine et al. | 260—124 |
| 3,190,919 | 6/1965 | Swanson | 260—567.6 |
| 3,232,870 | 2/1966 | Cowan et al. | 252—8.5 X |

OTHER REFERENCES

Zimmerman et al. Supplement I to the 1953 Edition of Handbook of Material Trade Names, Industrial Research Service Inc., Dover, N.H., 1956, p. 221.

HERBERT B. GUYNN, *Primary Examiner.*

U.S. Cl. X.R.

106—32, 38.2, 285; 252—8.5, 8.55, 33, 33.4, 308; 260—124